United States Patent [19]

Capper et al.

[11] Patent Number: 5,317,474

[45] Date of Patent: May 31, 1994

[54] MODULE FOR TELEPHONE LINE CONDUCTOR PAIR HAVING SINGLE PROTECTOR UNIT

[75] Inventors: Harry M. Capper, Harrisburg; James W. Robertson, Oberlin, both of Pa.

[73] Assignee: The Whitaker Corporation, Wilmington, Del.

[21] Appl. No.: 59,789

[22] Filed: May 7, 1993

Related U.S. Application Data

[63] Continuation-in-part of Ser. No. 880,449, May 8, 1992.

[51] Int. Cl.⁵ .................. H04H 1/04; H01R 4/00; H01R 9/24
[52] U.S. Cl. .................. 361/119; 361/823; 361/111
[58] Field of Search ............. 361/110, 111, 119, 127, 361/128, 120, 426, 392, 393, 390, 394, 724, 728, 729, 730, 823

[56] References Cited

U.S. PATENT DOCUMENTS

| | | | |
|---|---|---|---|
| 3,818,271 | 6/1974 | Baumbach | 317/16 |
| 3,868,080 | 2/1975 | Olson | 248/205 |
| 4,133,019 | 1/1979 | Roach et al. | 361/124 |
| 4,158,869 | 6/1979 | Gilberts | 361/118 |
| 4,159,500 | 6/1979 | Baumbach et al. | 361/119 |
| 4,161,762 | 7/1979 | Scheithauer | 361/124 |
| 4,326,231 | 4/1982 | Coren | 361/119 |
| 4,575,169 | 3/1986 | Duplatre et al. | 439/44 R |
| 4,613,732 | 9/1986 | Cwirzen et al. | 179/178 |
| 4,624,518 | 11/1986 | Seidel | 439/97 P |
| 4,675,778 | 6/1987 | Cwirzen | 361/119 |
| 4,729,059 | 3/1988 | Wang | 361/426 |
| 4,742,541 | 5/1988 | Cwirzen et al. | 379/412 |
| 4,881,255 | 11/1989 | Neuwirth et al. | 361/119 |
| 4,901,189 | 2/1990 | Merriman et al. | 361/119 |
| 4,922,374 | 5/1990 | Mueller et al. | 361/119 |
| 5,006,077 | 4/1991 | Loose et al. | 439/409 |
| 5,120,245 | 6/1992 | Robertson et al. | 439/395 |
| 5,144,533 | 9/1992 | Annett | 361/390 |
| 5,145,388 | 9/1992 | Brownlie et al. | 439/142 |
| 5,154,639 | 10/1992 | Knoll et al. | 439/620 |
| 5,219,302 | 6/1993 | Robertson et al. | 439/404 |

OTHER PUBLICATIONS

AMP Catalog 82257, AMP Incorporated, Sep. 1991; 6 pages.
Bellcore Tech. Ref. No. TR-TSY-000070; Feb. 1985, Bell Communications Research.
Bellcore Tech. Ref. No. TR-TSY-000071; Feb. 1985, Bell Communications Research.
Joslyn Technical Data, two pages, Mar. 1990, Joslyn Electronic Systems.
Ser. No. 07/863,626 filed Sep. 3, 1992, Capper et al. (Abstract & Drawings).

Primary Examiner—A. D. Pellinen
Assistant Examiner—Ronald W. Leja
Attorney, Agent, or Firm—Anton P. Ness

[57] ABSTRACT

A single modular assembly (10) has two terminals (16) in housing cavities (22) each with a pair of slots (46,48) for termination by rotary actuation to respective conductors (30,32) of two cables, for crossconnecting or splicing the tip and ring lines of a customer's service line with those of a cable extending to the main distribution line. Each terminal (18) is in electrical engagement with one of the two active electrode leads (52,54) of a common protector unit (20) contained in a housing section (18) of the module. The protector unit (20) includes a ground electrode lead (50) grounded to a ground strap (70) which includes a contact section (72) extending from the module to be assuredly engaged with a ground circuit. Crossconnection of the tip and ring wires of service cables in the module simultaneously provides voltage and current surge protection for the circuits.

12 Claims, 4 Drawing Sheets

MODULE FOR TELEPHONE LINE CONDUCTOR PAIR HAVING SINGLE PROTECTOR UNIT

RELATED APPLICATION INFORMATION

This is a continuation-in-part of U.S. patent application Ser. No. 07/880,449 filed May 8, 1992.

FIELD OF THE INVENTION

This relates to the field of electrical connectors and more particularly to connectors for connecting pairs of signal wires together.

BACKGROUND OF THE INVENTION

In the telecommunications industry, telephone cable is introduced to individual telephone sites such as residences, mainly through use of a splice of the signal wires of the cable to respective house wires at a junction located outside or inside the house. The junction is housed within a protective enclosure which is mounted usually to an outside wall of the house. One example of an assembly of a splice terminal block and self-sealing enclosure therefor is disclosed in U.S. patent application Ser. No. 07/708,405 filed May 31, 1991 and U.S. Pat. No. 5,145,388. Therein, a terminal block has a single-piece barrel-shaped terminal with connecting sections for both wires to be spliced, and the terminal is of the insulation piercing or displacement type which eliminates the need for stripping the insulation from the signal wire conductors. A dielectric housing includes an integrally molded center post within a tubular terminal receiving housing section, both coextending from a common base section and defining an annular cavity, the housing section providing wire-receiving openings through side walls and into the cavity aligned with an aperture through the center post, enabling insertion of wire ends during splicing.

A barrel-shaped terminal and an associated lug-capped tubular actuator is then assembled to the housing, with the barrel terminal surrounding the center post within the cavity and having apertured insulation displacement contact sections which are initially aligned with the wire-receiving openings of the housing and center post, and the actuator also having profiled apertures therethrough extending partially around the circumference and also aligned with the wire-receiving openings of the housing, center post and terminal. The lug extends above the housing upon assembly to be accessible to tooling for rotation thereof to rotate the actuator and the terminal.

During splicing the wire ends of both wires are inserted into respective openings and through the apertured contact sections until abutting stop surfaces of the housing which then holds the wire ends at two spaced locations, both outside and within the terminal wall; the actuator is then rotated through an angular distance of about a quarter turn in turn rotating the terminal, and the constricted edges of a precisely profiled slot extending from each of the terminal's apertures penetrate the wire insulation of both wires simultaneously and engage the conductors therewithin, completing the splice.

The terminal blocks of Ser. No. 07/708,405 are modular in nature, comprising a pair defined in the same housing member for mounting within an enclosure adapted for a plurality of such modules. The two-terminal block housing is mountable in a selected orientation such that the wire-receiving openings of each of the terminal blocks are oriented facing a cable exit of the enclosure, or other common point from where the pairs of conductors originate as discrete wires from two cables.

It is desired to provide the telephone line to a particular customer with overvoltage and overcurrent protection on the circuits which protect the circuits of the customer's equipment from energy surges, which may be induced by lightning for example. Several examples of protector units are disclosed in U.S. Pat. Nos. 4,158,869; 4,161,762; and 4,133,019. Modules containing such protectors are disclosed in U.S. Pat. Nos. 4,742,541; 4,159,500; 4,613,732 and 4,675,778. A protective plug for a distributor strip utilized in telecommunications systems is disclosed in U.S. Pat. No. 5,154,639 to have a protector unit contained therein. The telecommunications industry has established standards for performance and certain dimensional and design requirements for such protectors; one example is Bellcore Technical Reference No. TR-TSY-000073, Issue 1, Jan., 1987, entitled "Customer Station Three-Element Gas Tube Protectors".

In U.S. patent application Ser. No. 07/880,449 filed May 8, 1992 is disclosed a single module having two barrel-shaped terminals each with a pair of insulation displacement slots for termination by rotary actuation to respective conductors of two cables, for crossconnecting or splicing the tip and ring lines of a service line extending to a customer with a cable extending to the main distribution line. Each barrel terminal is in electrical engagement with a circuit element such as a wire length extending to a respective separate portion of the module for electrical connection to an active electrode of a respective protector unit within a respective housing section. The two protector units each include a ground electrode grounded to a common ground strap which includes a contact section exposed along the bottom of the module to be assuredly engaged with a ground strap along the floor of the enclosure upon mounting of the module therein, for grounding to a ground stud for external system grounding. The wire-receiving apertures of the two housing sections containing the terminals are preferably oriented to face a cable exit of the enclosure to facilitate receipt of the conductors for wire termination upon rotation actuation of the terminals by respective lug-capped actuators. An enclosure for protected terminal blocks or modules includes a ground strap extending from a ground stud to each terminal block mounting region, enabling the contact section of the module ground strap to engage its top surface upon mounting of the terminal block in position.

It is desired to provide a module for electrically connecting a pair of signal wires of a customer line with provision for integral means for protecting the circuits against voltage and current surges when the module is assembled within an appropriate enclosure, upon termination of a service wire to a terminal.

It is desired that such module permit in-line circuit protection simultaneously with splicing of the pair of wires of the service line.

It is additionally desired to protect both circuits interconnecting tip and ring lines of a service wire, with a single protector unit.

SUMMARY OF THE INVENTION

The present invention is a single module having two barrel-shaped terminals each with a pair of insulation displacement slots for termination by rotary actuation to respective conductors of two cables, for crossconnecting or splicing the tip and ring lines of a service line extending to a customer with a cable extending to the main distribution line. Each barrel terminal is in electrical engagement with a respective lead extending to a respective separate active electrode of a single protector unit disposed within a housing section, which may be a separate cover member securable to the main housing assembly. An advantage of both terminals being connected to leads of the same protector unit is that, if a voltage or current surge occurs on either the tip or ring circuit, the protector unit will short out both circuits to ground.

The protector unit includes a ground electrode grounded to a common ground strap which includes a contact section extending from the module to be assuredly engaged with a ground strap of the enclosure upon mounting of the module therein, for grounding to a ground stud for external system grounding. The wire-receiving apertures of the two housing sections containing the terminals are preferably oriented to face a cable exit of the enclosure to facilitate receipt of the conductors for wire termination upon rotation actuation of the terminals by respective lug-capped actuators.

In one aspect of the invention, the protector unit is first secured to a subassembly of the main housing member and terminals in respective sections thereof, with active electrode leads of the protector unit in electrical engagement with the terminals, and depending from a bottom surface of the main housing. The protector housing member may then be a separate housing member securable to the bottom surface of the main housing for a cavity thereof to receive the protector unit thereinto.

In another aspect of the invention, the protector unit affixed to the bottom surface of the main housing member includes a ground electrode lead which is positioned to be assuredly connected to a contact section of the ground strap affixed to the protector housing section upon urging the protector housing section against the bottom surface of the main housing member. The contact section has a lead-receiving slot into which the ground electrode lead is urged into an interference fit during assembly without requiring manipulation or tools. Thus the protector housing section can be free of any openings otherwise needed for tools to connect the ground electrode lead to the ground strap, and the cavity containing the protector unit can thus be easily environmentally sealed.

In yet another aspect of the invention, the protector housing section may be a separate member to be affixed to the bottom surface of the main housing member in an arrangement of interfitting flanges peripherally surrounding the assembly interface, and a sealing member may be incorporated into the interfitting flange arrangement to facilitate environmental sealing of the assembly interface.

It is an objective of the present invention to provide a single assembly adapted to receive and crossconnect ends of service and distribution tip and ring conductors and include integrally therewithin protection of the circuits thus defined against voltage and current surges.

It is a further objective to provide a single assembly having a single protector unit which protects both the tip and ring circuits.

It is also an objective to provide an environmentally sealed cavity surrounding the protector unit.

It is yet another objective to provide such a protected module having components which are easily assembled without special tools or procedures for either assembly or sealing.

An embodiment of the present invention will now be described by way of reference to the accompanying drawings.

DETAILED DESCRIPTION OF THE PREFERRED EMBODIMENT

Figure 1:
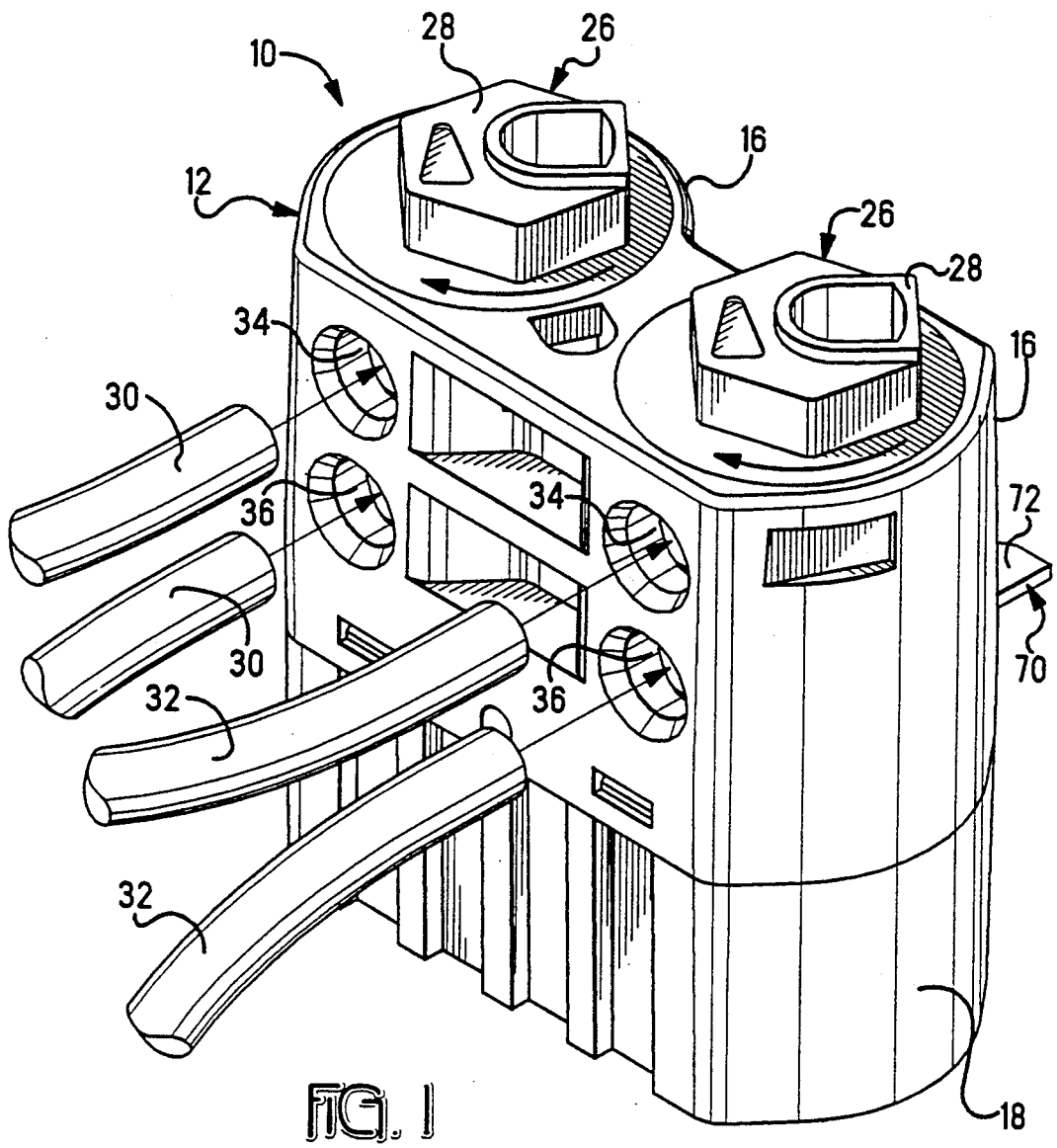
FIG. 1 is an isometric view of the protected module of the present invention showing the assembly ready for receipt thereinto of ends of conductors of two dual conductor telephone cables for paired crossconnection.
Figure 2:
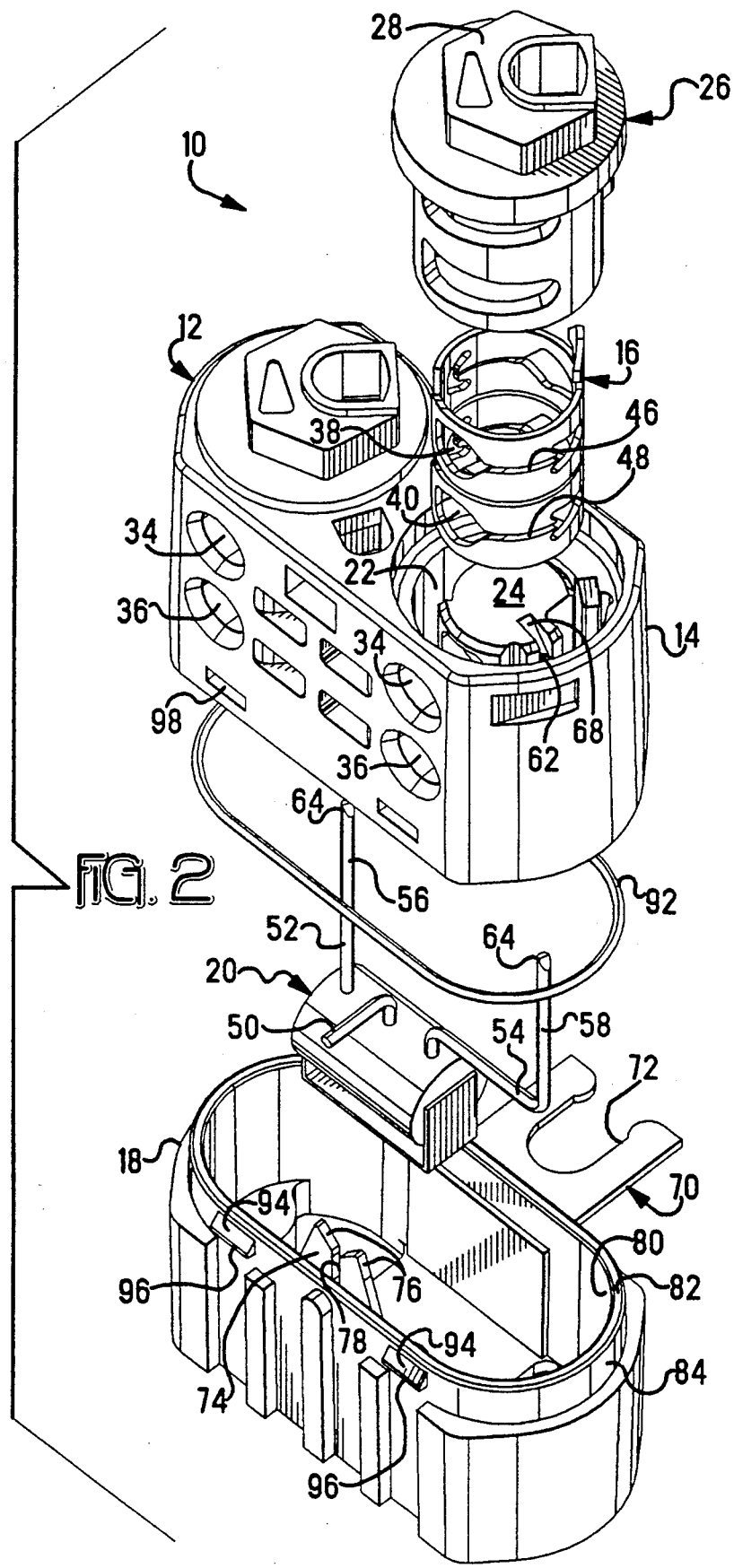
FIG. 2 is an exploded view of the components of the protected module of FIG. 1.

Protected module 10 of the present invention includes a housing assembly 12 including a pair of housing sections 14 for respective barrel terminals 16, and a protector housing section 18 including a protector unit 20. Each housing section 14 has an annular cavity 22 therein about a center post 24, into which is inserted a barrel terminal 16 to surround the center post. Thereafter an actuator 26 is inserted into annular cavity 22 surrounding the terminal and having a lug-shaped cap 28 adapted to be rotated by an appropriate tool. Actuator 26 includes embossments engaging terminal 16 and enabling rotation of terminal 16 for wire termination. Ends of two wires 30,32 are inserted through apertures 34,36 of the walls of respective housing sections, through openings in the actuator, through openings 38,40 of the terminal and at least into apertures 42,44 of the center post all coaligned. Upon rotation of terminal 16 by actuator 26, profiled slots 46,48 extending from the openings of the terminal penetrate the wire insulation and electrically engage the conductors of both wires thereby interconnecting them. Both of wires 30 may be tip lines of a pair of dual conductor telephone cables, and both wires 32 can be ring lines of the cables.

Protector unit 20 disposed in housing section 18 includes a ground electrode lead 50 and a pair of active electrode leads 52,54 to extend into each annular cavity 22 of respective housing sections 14, to interconnect the terminal therein to protector 20. Each lead 52,54 includes an end section 56,58 extending within and along a groove 60,62 vertically along center post 24 to a free end 64. Free ends 64 of lead end portions 56,58 are insertable into respective apertures 66 into bottom surface 68 of module housing 12 which have tapered entrances facilitating insertion, and which are aligned with grooves 60,62. Upon full insertion along grooves 60,62, free ends are preferably bent toward the center of center post 24 along beveled surface portion 68 at the top of grooves 60,62; such bending secures the leads in place during assembly and facilitates initial bearing engagement with the bottom edge of a terminal 16 upon insertion of terminals 16 thereover and into annular cavities 22 without stubbing. The depth of each groove 60,62 is selected considering the diameter of end section 56,58 so that end section 56,58 protrudes laterally partially out of its groove 60,62 to engage the inside surface of terminal 16 in intimate contact therewith when terminal 16 is inserted into annular cavity 22 upon full assembly. Upon full terminal insertion, terminal 16 is held compressed against lead end portion 56,58 and is still rotatable in annular cavity 22 upon rotation of actuator 26.

A module ground strap 70 which extends outwardly of housing section 18 to a bifurcated contact section 72 at one end. Ground strap 70 extends toward housing 12 to a lead-receiving contact section 74 at the other end; beams 76 thereof define therebetween a slot 78 having a width just less than the diameter of ground electrode lead 50; and upon urging of lead 50 thereinto, an assured electrical connection between lead 50 and ground plate 70 is established by compression fit. Bifurcated contact section 72 is thus exposed to be easily electrically connected to a ground strap of an enclosure (not shown) within which protected module 10 is to be mounted, which is connected to system ground. Such an enclosure would have a ground post extending upwardly from the enclosure floor to be mechanically and electrically connected to bifurcated contact section 72. A pair of embossments on the enclosure floor optionally may be provided to located and orient module 10 by being received into corresponding recesses into the bottom surface of housing section 18.

Figure 3:
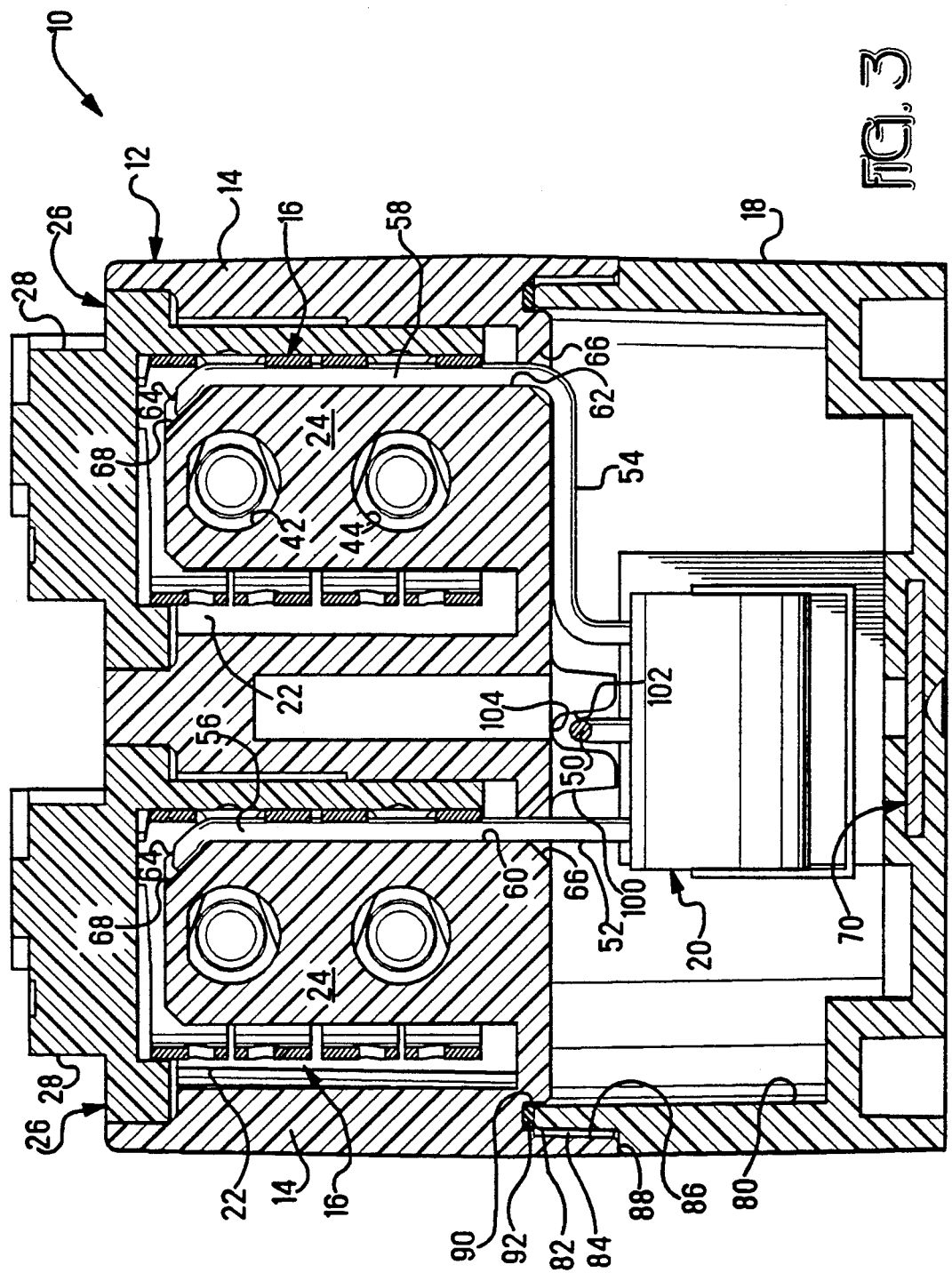
FIG. 3 is a cross-sectional view of the protected module of FIG. 1 illustrating the protector unit and the connections of the leads thereof to the terminals.
Figure 4:
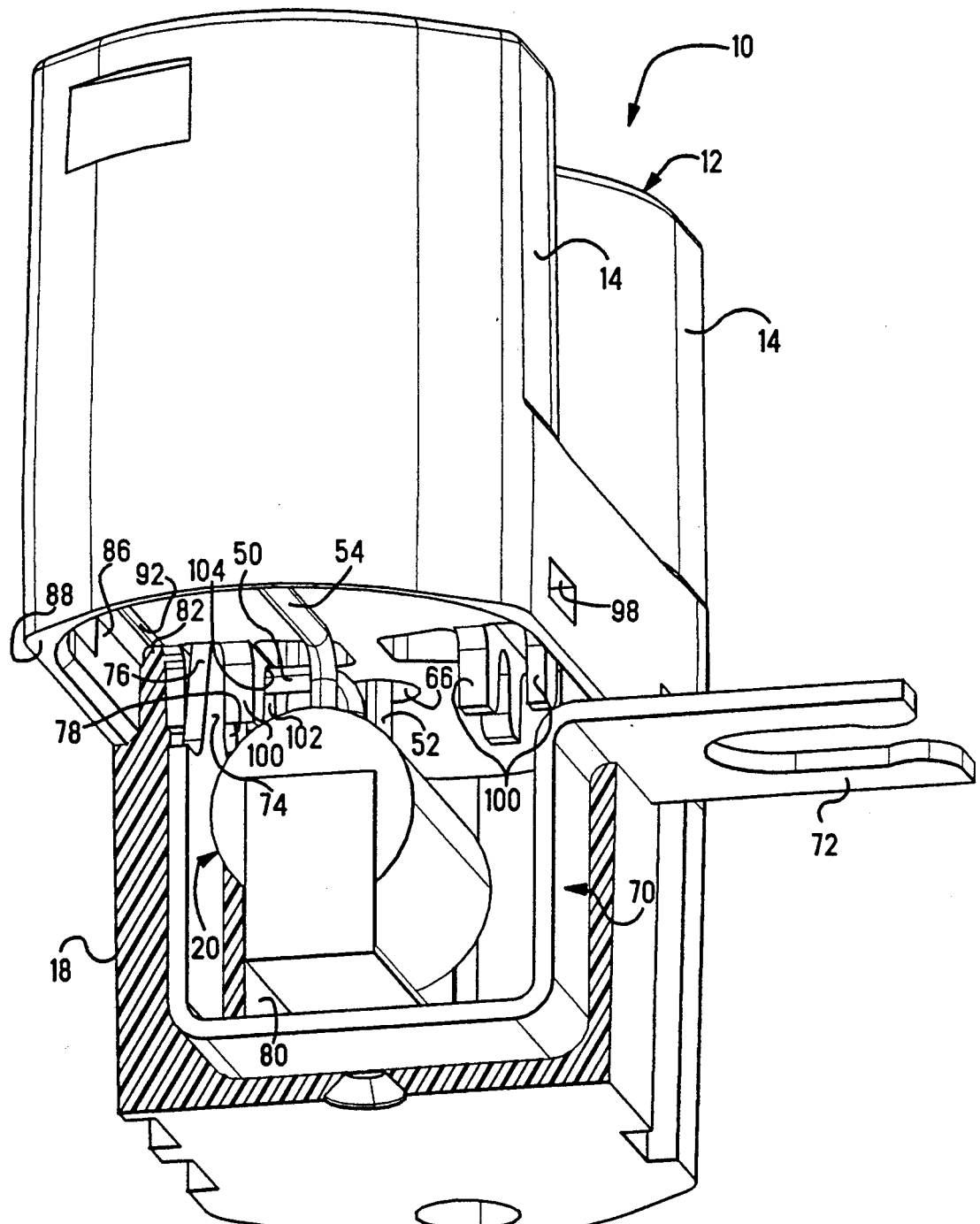
FIG. 4 is a partial section view of the module showing the protector unit and the ground strap thereof disposed in the protector housing section.

Protector housing section 18 includes a large cavity 80 within which protector unit 20 is disposed. The protector housing section is assembled to housing member 12 at an assembly interface, with the cavity open to the proximate or bottom surface 68 of housing member 12, and preferably including a pair of interfitting flanges peripherally surrounding the assembly interface. Upper edge 82 of housing section 18 is peripherally recessed at 84 to interfit with internal recess 86 of lower edge 88 of module housing 12 as seen particularly in FIGS. 3 and 4. Internal recess 86 further includes a channel 90 defining a seat for a seal member 92 such as an O-ring, which is compressed therewithin upon securing of protector housing section 18 to module housing 12.

While protector housing section 18 may be affixed to housing member 12 in several possible ways, securing may be accomplished by utilizing at least a pair of cooperating latch arrangements. The embodiment shown includes four spaced projections 94 extending outwardly from upper edge 82 of protector housing section 18 defining downwardly facing latching surfaces 96, which are dimensioned to bear against the inside surface of internal recess 80 during final assembly (with the resilient nature of the plastic housing material permitting such cooperation), and are received latchingly into corresponding apertures 98 defined through the lower edge 88 from internal recess 86.

With the embodiment of protected module 10, the protector unit 20 may be affixed to the main housing with its active electrode leads 52,54 electrically connected to respective terminals 16 in annular cavities 22 to define a housing subassembly, with the protector unit 20 thus depending from bottom surface 68 at the assembly interface, to be received into cavity 80 of protector housing section 18 during final stages of assembly. It is preferable to provide a pair of slightly spaced apart lead-receiving nests 100 associated with ground electrode lead 50 of protector unit 20. Each of nests 100 contains a slot 102 and each nest 100 extends below bottom surface 68 of module housing 12 on either side of lead-receiving contact section 74 of ground strap 70, with slots 102 aligned with slot 78 thereof. During final assembly, with protector unit 20 disposed along and depending from bottom surface 68 of module housing 12, ground electrode lead 50 extends through slots 102 of spaced nests 100. As ground electrode lead 50 enters lead-receiving slot 78, nests 100 maintain lead 50 in position while bottoms 104 of slots 102 engage lead 50 and urge lead 50 downwardly into slot 78 in interference fit therethrough, assuring an electrical connection of the ground electrode of protector unit 20 with ground strap 70.

The ground strap 70 may be insert molded within the protector housing section 18, and thus embedded with only the bifurcated contact section 72 and the lead-receiving contact section 74 exposed. Optionally a separate ground strap member may be affixed to the molded housing section with its ground contact section extending outwardly through a slot in a wall of the housing, which then preferably would be sealed.

The arrangement of lead-receiving nests 100 and contact section 74 for connecting the ground electrode lead 50 to insert molded ground strap 70, allows the protector housing section 18 to be free of openings otherwise necessary for manually executed or tool-assisted electrical connection to be performed. The embodiment of protected module 10 thus includes a ground strap 70 adapted to become assuredly electrically connected to the ground electrode lead 50 of the protector unit 20 upon assembly of the protector housing section 18 to housing member 12 unassisted by manipulation, whereby the protector housing section may be free from having to provide any access to the ground electrode lead for connection to said ground strap, facilitating fabrication of an environmentally sealed assembly.

A protector 20 as shown is available from Shinko Electric Industries Company, Ltd., Nagano City, Japan under the trade identification Three-Element Ceramic Surge Arrestor having Part No. 3P-19AL350FSVS. Module ground strap 70 may be tin-plated copper alloy.

Modifications and variations may occur to the embodiment disclosed herein which are within the spirit of the invention and the scope of the claims.

We claim:

1. A terminal block for crossconnecting respective conductors of two-wire service cables having integral surge protection for the circuits thus defined, comprising:
   a terminal housing module section having a pair of housing sections for respective terminals, and two terminals disposed in respective terminal-receiving cavities of said housing sections each having a pair of conductor-terminating sections exposed in respective conductor-receiving openings of said housing sections;
   a protector housing section including a cavity therein having disposed therein a protector unit having a ground electrode and a pair of active electrodes, and further having a module ground strap secured thereto having a first contact section in electrical engagement with said ground electrode of said protector unit and a second contact section exposed for grounding engagement with an external ground circuit for system ground; and
   leads extending from said active electrodes of said protector unit to end portions secured in electrical engagement with respective said terminals upon complete assembly, whereby a terminal block is defined adapted for first conductors of first and second twowire cables to be terminated to one of said terminals, and for second conductors of said first and second two-wire cables to be terminated to the other thereof thus crossconnecting the service cables, whereupon the module provides voltage and current surface protection for the circuits of the service cables thus crossconnected with a single protector unit.

2. The assembly as set forth in claim 1 wherein said end portions of said active electrode leads extend into terminal-receiving cavities for electrical engagement with respective said terminals.

3. The assembly as set forth in claim 1 wherein said ground strap is embedded in dielectric material defining said protector housing section with said first and second contact sections exposed.

4. The assembly as set forth in claim 1 wherein said protector housing section and said terminal housing module section are separate members, said protector housing section includes an assembly face associated with a selected surface of said terminal housing module section and is affixable to said terminal housing module section along said selected surface thereof defining an assembly interface, and said cavity for housing said protector unit is open through said assembly face toward said selected surface in a manner permitting said active electrode leads thereof to extend through said selected surface for electrical connection to respective said terminals.

5. The assembly as set forth in claim 4 wherein said protector housing section and said terminal housing module section include cooperatively interfitting flanges peripherally surrounding said assembly interface, and said cooperatively interfitting flanges define at least a pair of cooperating latching arrangements, each said arrangement including a latching projection of one of said interfitting flanges on a surface thereof adjacent an opposing surface of the other of said interfitting flanges and a corresponding latching recess into said opposing surface of the other of said interfitting flanges.

6. The assembly as set forth in claim 4 wherein said protector housing section is free of openings through walls defining said cavity thereof, and a sealing member is disposed about the periphery of said assembly interface for environmentally sealing said cavity upon assembly of said protector housing section to said terminal housing module section.

7. The assembly as set forth in claim 6 wherein said protector housing section and said terminal housing module section include cooperatively interfitting flanges peripherally surrounding said assembly interface, and said sealing member is disposed within an outer one of said interfitting flanges.

8. The assembly as set forth in claim 7 wherein said cooperatively interfitting flanges define at least a pair of cooperating latching arrangements, each said arrangement including a latching projection of one of said interfitting flanges on a surface thereof adjacent an opposing surface of the other of said interfitting flanges and a corresponding latching recess into said opposing surface of the other of said interfitting flanges, said cooperating latching arrangements adapted to latch upon compression of said sealing member between said terminal housing module section and said protector housing section.

9. The assembly as set forth in claim 4 wherein said first contact section of said ground strap is proximate said assembly face and aligned with said ground electrode lead of said protector unit, whereby said ground strap is adapted to become assuredly electrically connected to said ground electrode lead of said protector unit when said protector unit is first affixed to said selected surface of said terminal housing module section at said assembly interface with active leads thereof electrically connected to respective said terminals to define a housing subassembly, upon assembly of said protector housing section to said terminal housing module section by movement of said protector housing section toward and against a selected surface of said terminal housing module section otherwise unassisted by manipulation, whereby said protector housing section may be free of any opening permitting access to said ground electrode lead for connection to said ground strap after assembly of the protector housing section to the terminal housing module section, facilitating fabrication of an environmentally sealed assembly.

10. The assembly as set forth in claim 9 wherein said first contact section of said ground strap includes a lead-receiving slot extending toward said selected surface of said terminal housing module section, and said ground electrode lead of said protector unit is oriented parallel to said selected housing surface enabling receipt thereof into said lead-receiving slot in an interference fit during final assembly of said protector housing section to said terminal housing module section having said protector unit affixed thereto along said selected surface of said terminal housing module section with said active electrode leads in electrical connection with respective said terminals.

11. The assembly as set forth in claim 9 wherein said ground strap is embedded in dielectric material defining said protector housing section with said first and second contact sections exposed.

12. The assembly as set forth in claim 9 wherein said selected surface of said terminal housing module section includes at least one lead-receiving nest having a slot through which said ground electrode lead of said protector unit is disposed prior to assembly of said protector housing section to said terminal housing module section, said lead-receiving nest being located at a position selected to coextend past said lead-receiving slot of said first contact section of said ground strap during assembly thereby holding said ground electrode lead aligned and positioned while being urged by a bottom surface of said nest slot into said lead-receiving slot of said first contact section in interference fit.

* * * * *